United States Patent [19]

Marvin R. Phillips et al.

[11] 4,386,451

[45] Jun. 7, 1983

[54] METHOD AND MEANS OF COMPRESSING MEAT PRODUCTS

[75] Inventors: Marvin R. Phillips, Knoxville, Tenn.; Erwin L. Johnston, Des Moines, Iowa

[73] Assignee: Boldt Industries, Inc., Des Moines, Iowa

[21] Appl. No.: 182,102

[22] Filed: Aug. 28, 1980

[51] Int. Cl.³ .......................... A22C 7/00; A22C 15/00
[52] U.S. Cl. .......................................... 17/1 R; 17/32; 100/194; 100/910
[58] Field of Search .......................... 17/1 R, 32, 44.2; 53/526, 438, 122, 527; 100/113, 194, 199, 114, 115, 200, 202, 207, 910

[56] References Cited

U.S. PATENT DOCUMENTS

| | | |
|---|---|---|
| 422,602 | 3/1890 | Loflin et al. .......................... 100/194 |
| 734,917 | 7/1903 | Marshall .......................... 100/113 |
| 1,195,370 | 8/1916 | Larsen .......................... 100/115 X |
| 1,880,679 | 10/1932 | Benn .......................... 17/44.2 X |
| 2,310,956 | 2/1943 | Hoy . |
| 2,310,957 | 2/1943 | Hoy . |
| 2,512,517 | 6/1950 | Bruce . |
| 2,752,062 | 6/1956 | Swingle . |
| 3,155,030 | 11/1964 | Curtis .......................... 100/194 |
| 3,393,809 | 7/1968 | Brown . |
| 3,473,465 | 10/1969 | Tonjum .......................... 100/194 |
| 3,606,025 | 9/1971 | Wilson . |
| 3,618,511 | 11/1971 | Matthews . |
| 3,704,791 | 12/1972 | Young . |
| 3,788,209 | 1/1974 | Artar . |
| 4,015,712 | 4/1977 | Wadensten . |
| 4,113,329 | 9/1978 | Thurman . |

FOREIGN PATENT DOCUMENTS 527320 4/1954 Belgium .......................... 100/199
968313 4/1950 France .......................... 100/910

Primary Examiner—Willie G. Abercrombie
Attorney, Agent, or Firm—Zarley, McKee, Thomte, Voorhees & Sease

[57] ABSTRACT

The method and means of compressing meat products is described which ensure that the top and bottom portions of the meat or poultry product or the like will be flattened and so that the meat product will have a predetermined thickness. The method comprises the steps of: (1) providing a support; (2) placing a first basket on the support; (3) placing in the first basket material to be compressed having a height greater than the height of the first basket; (4) placing a second basket on top of the material in the first basket; (5) placing in the second basket material to be compressed having a height greater than the height of the second basket; (6) repeating sequentially the foregoing steps until a sufficient quantity of material-filled baskets are vertically stacked to cause the weight of the material in the upper of the baskets to compress the material in the lower baskets to a predetermined thickness; and (7) mechanically compressing the material in at least the uppermost of the baskets to the predetermined thickness. The means for compressing the meat product comprises a plurality of nesting backets which are supported upon a wheeled support. The meat product is placed in each of the individual baskets and the weight of the uppermost baskets causes the meat product to be compressed to the desired thickness. Each of the baskets includes means thereon to limit its vertical movement with respect to the next lower basket. Each of the baskets includes a false bottom so that an air space is provided between the baskets.

5 Claims, 8 Drawing Figures

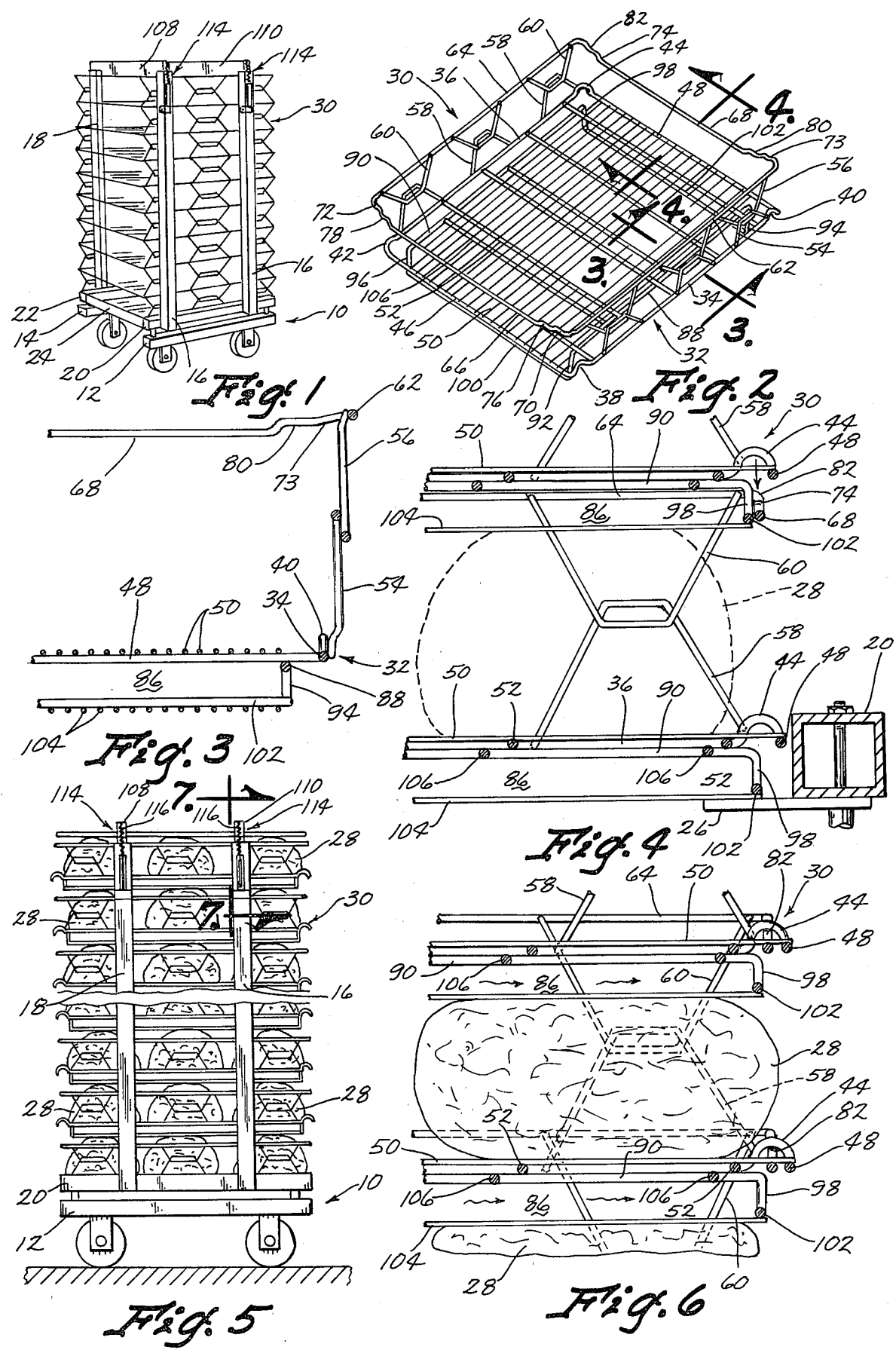

METHOD AND MEANS OF COMPRESSING MEAT PRODUCTS

BACKGROUND OF THE INVENTION

In the meat industry, it is a common practice to compress meat products such as hams, poultry or the like to a predetermined thickness in such a manner so that the top and bottom portions of the meat product will be flattened to enable the meat product to be placed in packages. One prior art method of compressing the meat product is to place the meat product in basket portions that use compression springs. This method is not precise and is not adaptable to mass production.

In another type of prior art method, mechanical levers or the like are used to move the material-containing baskets together. In all of the prior art methods, inconsistent product thickness does result. Additionally, uneven curing occurs due to the fact that air cannot circulate between the baskets which are stacked one upon the other.

Therefore, it is a principal object of the invention to provide an improved method and means for compressing meat products.

A further object of the invention is to provide a means for compressing meat products including a false bottom to ensure that smoking and curing air may pass between the stacked baskets.

A further object of the invention is to provide a means for compressing meat products including means to limit the amount of compression.

A still further object of the invention is to provide a method and means for compressing meat products which ensure that the meat product will have uniform thickness.

These and other objects will be apparent to one skilled in the art.

DESCRIPTION OF THE DRAWINGS

FIG. 1 is a perspective view of the device in operation;

FIG. 2 is a perspective view of one of the baskets;

FIG. 3 is a sectional view taken on line 3—3 of FIG. 2;

FIG. 4 is a sectional view taken on line 4—4 of FIG. 2 showing the baskets prior to ultimate compression;

FIG. 5 is a side elevational view of the baskets prior to ultimate compression;

FIG. 6 is a view similar to FIG. 4 showing the baskets in a position of ultimate compression;

SUMMARY OF THE INVENTION

Figure 7:
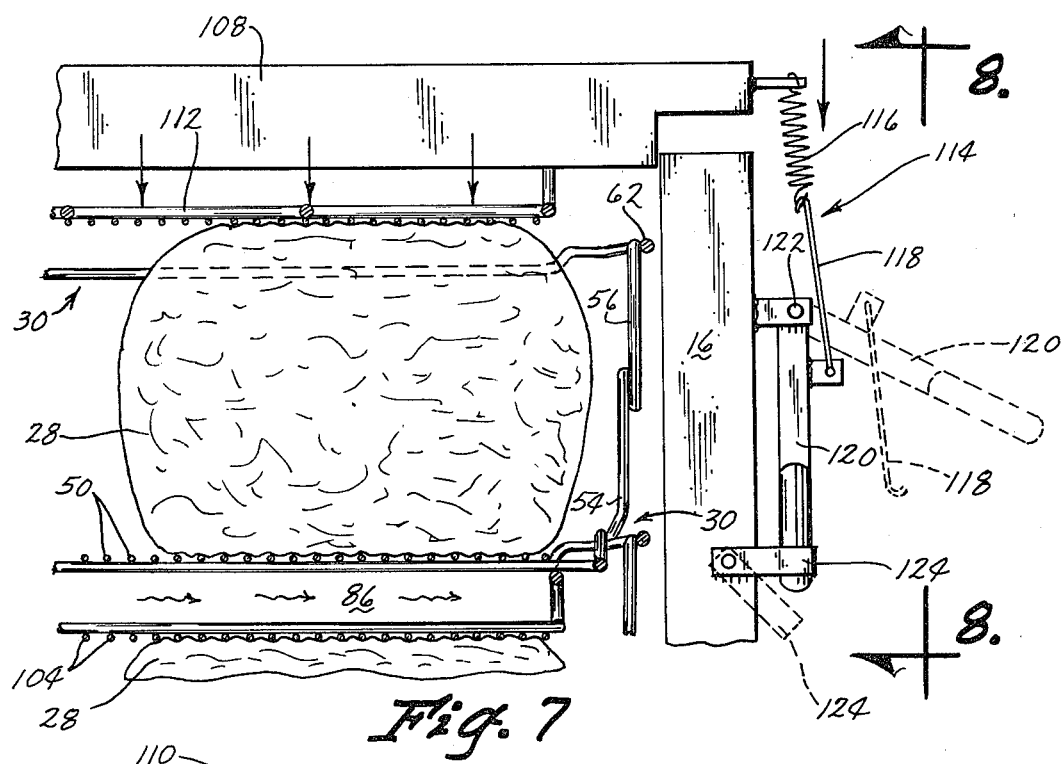
FIG. 7 is a side elevational view of the top portion of the device with the spring arrangement for compressing the meat in the top basket.

A method and means is disclosed for compressing meat or poultry products or the like to a predetermined thickness so that the compressed meat product will have flat top and bottom surfaces suitable for packaging. The meat product is placed in baskets which are stacked on top of one another. The weight of the meat product in the baskets causes the meat product to be compressed to a predetermined thickness. The meat product in the uppermost basket is mechanically compressed. Each of the baskets has a false bottom to ensure that air will be circulated between the baskets during the smoking and curing operation.

DESCRIPTION OF THE PREFERRED EMBODIMENT

Referring to the drawings, the numeral 10 designates a wheeled cart including wheeled frame members 12 and 14 having upright posts 16 and 18 extending upwardly therefrom. Frame members 20 and 22 are secured to and are positioned above frame members 12 and 14 inwardly of posts 16 and 18. A plurality of cross-braces or frame members 24 are secured to frame members 20 and 22 and extend therebetween. Plates such as 26 extend inwardly from frame members 20 and 22 for supporting the lowermost basket as illustrated in FIG. 4. In the drawings, the numeral 28 refers to the meat product being compressed such as a ham or the like.

Basket 30 comprises a bottom 32 including side members 34 and 36 having inverted U-shaped arcuate portions 38, 40 and 42, 44 at the ends thereof. End member 46 extends between the outer ends of arcuate portions 38 and 42 while end member 48 extends between the outer ends of arcuate portions 40 and 44. A plurality of spaced-apart support rods 50 are welded to and extend between end members 46 and 48. A plurality of spaced-apart rods 52 are welded to and extend between side members 34 and 36 beneath rods 50 transversely to rods 50.

Inverted V-shaped members 54 are welded to side member 34 and extend upwardly therefrom and have V-shaped members 56 welded to the outside portions thereof as illustrated in the drawings. Likewise, inverted V-shaped members 58 are welded to side member 36 which extend upwardly therefrom and which have the V-shaped members 60 welded to the outside portions thereof.

The upper end of basket 30 is comprised of side members 62 and 64 having end members 66 and 68 extending therebetween. End members 66 and 68 are provided with stepped portions 70, 72 and 73, 74, respectively, adjacent their outer ends defining shoulders 76, 78, 80 and 82, respectively. The upper ends of members 56 and 60 are welded to side members 62 and 64 respectively.

The basket 30 has a false or double bottom 84 to create an air space 86 between the lower end of an upper basket and the upper end of the basket immediately therebelow. Bottom 84 includes side members 88 and 90 having downwardly extending portions 92, 94 and 96, 98 at the ends thereof. End members 100 and 102 extend between portions 92, 96 and 94, 98. A plurality of spaced-apart rods 104 extend between end members 100 and 102 in a plane below side members 88 and 90. Spaced-apart rods 106 extend between side members 88 and 90.

Figure 8:
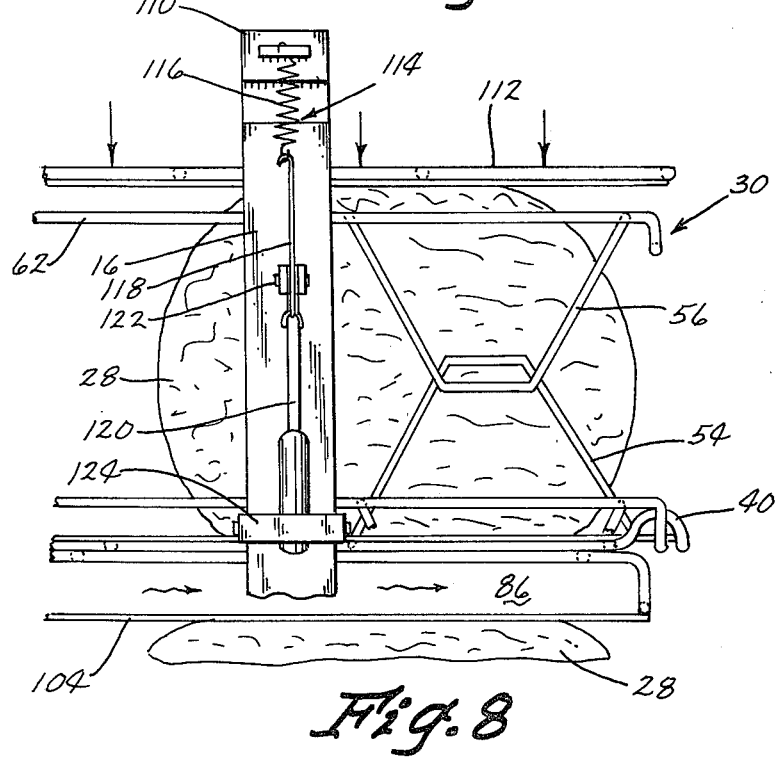
FIG. 8 is another view of FIG. 7 taken on line 8—8.

FIGS. 7 and 8 illustrate the means for applying compressive force to the upper baskets 30. A pair of bars 108 and 110 are positioned between the posts 16 and 18. A grill assembly 112 is secured to the bars 108 and 110 and extends therebetween at the underside thereof as best illustrated in FIG. 7. As seen in FIG. 7, grill assembly 112 is adapted to engage the top surface of the hams in the uppermost basket 30. The numeral 114 refers generally to the apparatus for compressing the hams in the uppermost basket and it should be understood that an apparatus 114 is provided at the upper ends of each of the posts 16 and 18. Inasmuch as each of the assemblies 114 is identical, only one assembly will be described. Spring 116 is connected to one end of the bar 108 and has a hook 188 extending therefrom. The lower end of hook 114 is pivotally secured to a lever 120 which is pivotally secured to post 16 at 122. The numeral 124 refers to a pivotal keeper which may be pivoted from the position illustrated by broken lines in FIG. 7 to the position illustrated by solid lines in FIG. 7 to maintain the lever 120 in its compression position. Thus, movement of the levers 120 from the position illustrated by broken lines in FIG. 7 to the position illustrated by solid lines in FIG. 7 causes the bars 108 and 110 to be lowered so that the grill assembly 112 engages the upper portion of the ham to compress the same.

The meat product is compressed and flattened as follows: The hams are placed in the baskets 30 with the baskets 30 stacked one upon the other on the wheeled cart. As illustrated in the drawings, the upper end of a bottom basket receives the bottom portion of a basket positioned immediately thereabove in a nesting relationship. As the baskets are stacked one upon the other, the weight of the meat product in the baskets causes the meat product to be compressed. An upper basket will move downwardly with respect to the basket immediately therebelow until the arcuate portions 38, 40 and 42, 44 engage the shoulders 76, 78, 80 and 82, which limits the downward movement of the basket so that a predetermined thickness of the meat product is achieved. Without the engagement of the arcuate portions with the shoulders, the meat products at the bottom of the stack would be subjected to greater forces of compression than those at the upper portion of the stack, which would result in the lowermost meat products being compressed to a greater degree than the uppermost meat products.

The uppermost basket 30 is positioned as previously described with the assemblies 114 being actuated to compress the meat product in the uppermost basket and which causes the uppermost basket to move downwardly to compress the meat product in the basket immediately therebelow. The cart is then wheeled into the smoking and curing room where the product is smoked and cured. A very important aspect of the method and means of this invention is that each of the baskets has the false or double bottom as previously described to create the air space 86 between the lower end of an upper basket and the upper basket of the basket immediately therebelow. The air space 86 ensures that air will circulate between the baskets during the curing and smoking operation so that uniform curing and smoking is achieved.

Thus it can be seen that a novel method and means has been described which not only ensures that the meat product will have a flattened top and bottom portion to facilitate packaging, but which also ensures that the meat product will have a predetermined thickness. Thus it can be seen that the invention accomplishes at least all of the stated objectives.

We claim:
1. In combination,
a wheeled cart means,
a plurality of baskets removably positioned on said cart means one upon the other in a semi-nesting position wherein the lower ends of the baskets are at least partially received by the upper ends of baskets positioned therebelow,
each of said baskets having an open upper end and substantially an open bottom and sides,
each of said baskets adapted to receive meat products therein which have heights greater than the height of the basket,
each of said baskets including support means on said sides of said basket adapted to receive and support the upper adjacent basket for limiting the downward movement of the basket thereabove so that the meat product will not be compressed beyond a predetermined thickness,
and means on said cart means for mechanically compressing the material in at least the uppermost of said baskets to said predetermined thickness.

2. A basket for compressing meat, poultry or the like comprising,
a basket having substantially open bottom and side portions,
a false bottom portion secured to said basket in spaced relation to and below said bottom portion,
a basket support means on said side portions of said basket adapted to receive and support a second basket, and
a basket engaging means on said false bottom portion to engage in nesting relation a third basket.

3. The combination of claim 2 wherein each of said baskets has a false bottom provided thereon to create an air space below each basket, said substantially open sides of each of said baskets permitting air to come into contact with the meat product in said basket through the sides of said basket and through said air space created by said false bottom.

4. The combination of claim 2 wherein said baskets include means for creating flattened surfaces at the top and bottom portions of the compressed meat products.

5. The basket of claim 2 wherein a plurality of said baskets are stacked one upon the other in vertical relation to each other adapted to receive food material therein with said false bottom portions engaging the tops of said material whereby the weight of said baskets and said material will cause the material in the lowermost baskets to be partially compressed to permit the basket engaging means on said false bottom portions to nest on the basket support means of the next lowermost basket.

* * * * *